United States Patent [19]
Ono et al.

[11] Patent Number: 5,315,457
[45] Date of Patent: May 24, 1994

[54] MAGNETIC RECORDING APPARATUS WITH PILOT SIGNAL RECORDED IN SUCCESSIVE TRACKS WITH CHANGING PILOT FREQUENCY

[75] Inventors: Koichi Ono; Tsunekazu Okada; Seiichi Hataoka, all of Kanagawa, Japan

[73] Assignee: Sony Corporation, Tokyo, Japan

[21] Appl. No.: 829,313

[22] Filed: Feb. 3, 1992

[30] Foreign Application Priority Data

Feb. 8, 1991 [JP] Japan .................. 3-039495

[51] Int. Cl.$^5$ .................. G11B 5/584; G11B 5/58; H04N 5/78
[52] U.S. Cl. .................. 360/77.14; 360/77.15; 360/70; 360/9.1
[58] Field of Search .................. 360/77.14, 77.15, 73.11, 360/9.1, 27, 11.1, 70; 358/338, 324, 321, 323

[56] References Cited

U.S. PATENT DOCUMENTS

| | | | |
|---|---|---|---|
| 4,573,089 | 2/1986 | Maeda et al. | 360/70 |
| 4,658,309 | 4/1987 | Tasuda et al. | 360/77.14 |
| 4,663,673 | 5/1987 | Doutsubo | 360/9.1 |
| 4,823,206 | 4/1989 | Nemoto et al. | 360/77.14 |
| 4,873,585 | 10/1989 | Blanton et al. | 358/335 |

OTHER PUBLICATIONS

Patent Abstracts of Japan, vol. 13, No. 142 (E-739) Apr. 7, 1989 & JP-A-63 304 781 (Sony Corp) Dec. 13, 1988.
Patent Abstracts of Japan vol. 11, No. 26 (P-539) Jan. 24, 1987 & JP-A-61 196 453 (Canon Inc) Aug. 30, 1986.

*Primary Examiner*—Aristotelis Psitos
*Assistant Examiner*—Varsha V. Sheladia
*Attorney, Agent, or Firm*—William S. Frommer; Alvin Sinderbrand

[57] ABSTRACT

A video signal is recorded in successive tracks on a recording medium together with a pilot signal, the latter having a frequency that changes cyclically with a different one of at least four frequencies in successive tracks. A field detector detects sequential fields in the frames of the video signal, and rotation of the usual rotary transducers is servo-controlled in response to the detected sequence of fields and a pulse that is generated as the transducers rotate to represent the rotational phase of those transducers. A pilot signal generator generates the pilot signal with an initial frequency determined by an initial field in the detected field sequence, and with this frequency changing as a function of the detected sequential fields.

14 Claims, 2 Drawing Sheets

FIG. 1 (PRIOR ART)
FIG. 2 (PRIOR ART)
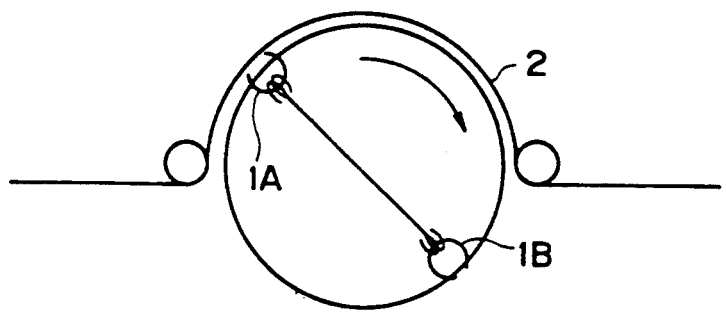
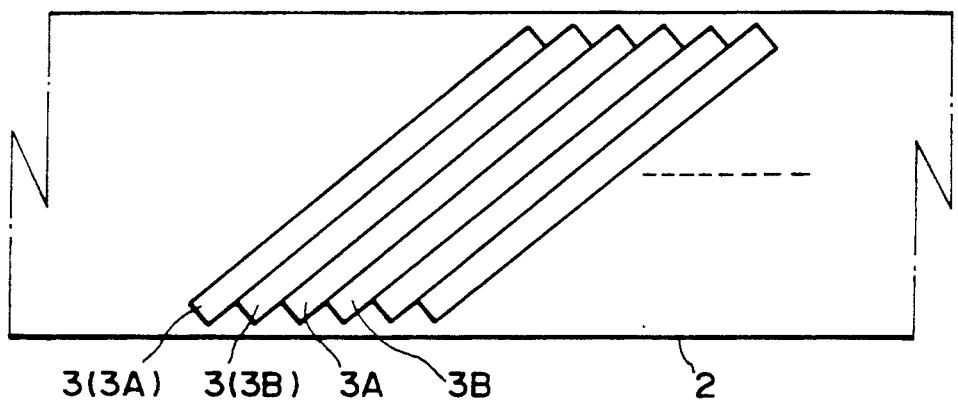
FIG. 5
| SN | nth FRAME | | (n+1)th FRAME | | (n+2)th FRAME | |
|---|---|---|---|---|---|---|
| | FIRST FIELD | SECOND FIELD | FIRST FIELD | SECOND FIELD | FIRST FIELD | |
| PR | | | | | | |
| SP | f1 | f2 | f3 | f4 | f1 | |
| PF | | | | | | |

MAGNETIC RECORDING APPARATUS WITH PILOT SIGNAL RECORDED IN SUCCESSIVE TRACKS WITH CHANGING PILOT FREQUENCY

BACKGROUND OF THE INVENTION

1. Field of the Invention

This invention relates to magnetic recording apparatus for recording a video signal and, more particularly, to such apparatus in which the video signal is recorded in successive tracks with proper framing, even at an edit point.

2. Description of the Prior Art

In one type of video tape recorder, such as an 8 mm format VTR, video signals are recorded in successive, contiguous tracks by two (or more) rotary transducers, or heads, which scan an arcuate extent of magnetic tape greater than 180°. FIG. 1 illustrates the relationship between the rotary heads and the magnetic tape in one embodiment; and FIG. 2 is a schematic representation of the record tracks recorded by this apparatus. From FIG. 1, it is seen that heads 1A and 1B are angularly separated from each other by 180° and scan alternate tracks across magnetic tape 2 which has a wrap angle about a guide drum that is greater than 180°. The tape advances over the surface of the guide drum in a diagonal direction, resulting in the recording of alternate contiguous tracks 3A and 3B, shown in FIG. 2.

As is conventional, the magnetic recording gap of head 1A is disposed at an azimuth angle different from that of head 1B. By using different azimuth angles, the well-known phenomenon of azimuth loss is relied upon to minimize undesired cross talk that may be picked up during reproduction. If it is assumed that head 1A records tracks 3A and head 1B records tracks 3B, then during a playback operation when head 1A scans track 3A, minimal cross talk is picked up by this head from adjacent tracks 3B. Likewise, because of azimuth loss, when head 1B scans a track 3B, minimal cross talk signals are picked up by this head from adjacent tracks 3A.

In a typical embodiment, each head records a video signal field interval in one track; and if two heads are used, as illustrated in FIG. 1, then one complete rotation of the heads results in the recording of a video frame. The heads thus are rotated at a rate equal to the video signal frame repetition rate which, of course, is in synchronism with the usual vertical synchronizing signal. Thus, head 1A records and reproduces alternate tracks 3A; and head 1B records and reproduces the remaining tracks 3B.

When recording video signals on magnetic tape 2, the information represented by those signals may be derived from separate sources, such as separate video cameras, separate video playback devices, or the like. Typically, the change over from one source to another is effected at the end of a field interval and not in the middle of that interval. Consequently, one may think of a so-called joint or edit point recorded on tape 2, wherein the track which precedes this joint or edit point contains video signals derived from one source and the track which immediately follows this joint or edit point contains video signals derived from a different source. Preferably, the joint or edit point always is provided such that track 3A contains video signals derived from the aforementioned first source and track 3B contains video signals derived from the second source. With this limitation, the continuity (or periodicity) of tracks 3A and 3B is maintained, even across a joint or edit point.

Although not shown in FIGS. 1 and 2, when successive tracks are recorded in accordance with the 8 mm VTR format, a pilot signal is recorded in each track together with the video signals. As is known to those of ordinary skill in the art, the frequency of the pilot signal is such that it may be superimposed onto the video signal without disturbing the video picture or sound which subsequently is reproduced. Typically, the frequency of the pilot signal is well below the frequency spectrum of the recorded video signals.

This pilot signal is used during a playback mode for controlling the tracking of the transducers such that transducer 1A is aligned with track 3A and transducer 1B is aligned with track 3B. Accordingly, the frequency of the pilot signal is changed from track to track; and this change occurs cyclically so that a respective pilot frequency is recorded in each of four successive tracks. Hence, the period of recurrence of the pilot signal frequency is equal to four field periods. If the pilot frequency recorded in a track is represented as $f_i$, then the relationship between the pilot frequency, the particular recording head which is used to record that pilot frequency superimposed onto the video signal and the field period of this video signal is shown in the following table:

TABLE 1

| Field Period | Pilot Frequency $f_i$ | Recording Head |
|---|---|---|
| 1 | $f_1 = f_H \times 378/58 =$ 103 kHz | 1A |
| 2 | $f_2 = f_H \times 378/50 =$ 119 kHz | 1B |
| 3 | $f_3 = f_H \times 378/36 =$ 165 kHz | 1A |
| 4 | $f_4 = f_H \times 378/40 =$ 149 kHz | 1B |

In the foregoing table, $f_H$ represents the horizontal frequency, and in the NTSC system $f_H = 15.734$ kHz.

From Table 1, it is appreciated that in the conventional 8 mm format, head 1A records a pilot frequency $f_1$ or $f_3$ and head 1B records a pilot frequency $f_2$ or $f_4$.

The phase relationship between the vertical synchronizing pulse and the horizontal synchronizing pulse in the NTSC system is such that a given state (or relation) recurs every two fields. For example, in the first field of a frame (usually identified simply as field one), the vertical blanking interval is spaced from the immediately preceding horizontal synchronizing pulse by one full line interval, and in the second field of that frame the vertical blanking interval is spaced from the last preceding horizontal synchronizing pulse by one-half of a line interval. After two field intervals, the vertical blanking interval once again is spaced from the last preceding horizontal synchronizing pulse by a full line interval.

Although the continuity or periodicity between tracks 3A and 3B is maintained as aforesaid, it is possible that the video signal which is recorded in the track immediately preceding the joint or edit point is an odd-numbered field, such as the first field of a frame, and the video signal recorded in the track immediately following the joint or edit point also is an odd-numbered field. Conversely, the video signal recorded in the tracks on either side of the joint or edit point may be an even-numbered field, such as the second field. Consequently, the fields recorded in successive tracks may appear as "odd-even-odd-odd-even . . . " or "odd-even-odd-eveneven-odd-even . . . ". Because of the different phase relationships between the vertical and horizontal synchronizing pulses in odd and even fields, if successive odd-numbered fields (or even-numbered fields) are recorded and subsequently played back, the reproduction of such successive fields will produce a disturbance in the continuity of the vertical and/or horizontal synchronizing pulses. That is, when successive odd-numbered fields or successive even-numbered fields are reproduced, a disturbance in the framing of the video picture produced therefrom will occur. Unless steps are taken to prevent an odd-numbered field (or even-numbered field) from being recorded on both sides of a joint or edit point, the reproduced video picture will contain a disturbance at that joint or edit point.

When video signals in the PAL system are recorded, the resultant disturbance produced in the continuity of the vertical or horizontal synchronizing pulse when the joint or edit point is reproduced adversely affects the usual AFC/APC circuits of a typical monitor/receiver. Thus, not only is a framing disturbance produced in the reproduced PAL video picture, but the color quality of that picture tends to be degraded.

OBJECTS OF THE INVENTION

Therefore, it is an object of the present invention to provide a magnetic recording apparatus which overcomes the aforenoted drawbacks, defects and disadvantages.

Another object of this invention is to provide magnetic recording apparatus which avoids, or at least minimizes, framing disturbances in the video signal and video picture subsequently reproduced from the recorded video signals.

A further object of this invention is to provide magnetic recording apparatus which minimizes the possibility of recording successive odd-numbered or even-numbered fields at a joint or edit point.

An additional object of this invention is to provide magnetic recording apparatus in which color disturbances in the video picture reproduced from the magnetic medium recorded by that apparatus are eliminated, or at least substantially reduced, particularly when a joint or edit point on that medium is produced.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for recording a video signal in successive tracks on a record medium together with a pilot signal, wherein the pilot signal is cyclically recorded with a different one of at least four frequencies in successive tracks (the pilot signal being used for tracking control during signal reproduction). The video and pilot signals are recorded in successive tracks by plural rotary transducers. A field detector is supplied with the video signal for detecting sequential fields in the frames thereof. The phase of the rotary transducers is controlled in response to the detected field sequence and a pulse that is generated when the transducers assume a predetermined rotational phase. A pilot signal generator generates the pilot signal with an initial frequency determined by an initial field in the detected field sequence, the pilot frequency being changed as a function of the detected sequential fields.

As one feature of this invention, the vertical synchronizing signal included in the video signal is detected; and the frequency of the pilot signal is preset in response to a predetermined one of the vertical synchronizing signals. The frequency of the pilot signal is changed in response to each detected vertical synchronizing signal.

As an aspect of this feature of the invention, a cyclical counter counts each detected vertical synchronizing signal, and the pilot frequency is selected as a function of the count.

As another feature of this invention, the field detector detects a vertical synchronizing signal in a predetermined field in alternate frames of the video signal; and this is used to preset the count of the aforementioned counter. Preferably, the predetermined field is the initial field in alternate video frames.

BRIEF DESCRIPTION OF THE DRAWINGS

The following detailed description, given by way of example and not intended to limit the present invention solely thereto, will best be understood in conjunction with the following drawings, wherein:

FIG. 1 is a schematic representation of rotary transducers as they scan across a magnetic record medium;

FIG. 2 is a schematic representation of a typical 8 mm recording track format;

FIG. 5 is a general timing diagram useful in understanding the operation of the embodiment shown in FIG. 3.

DETAILED DESCRIPTION OF A PREFERRED EMBODIMENT

Figure 3:
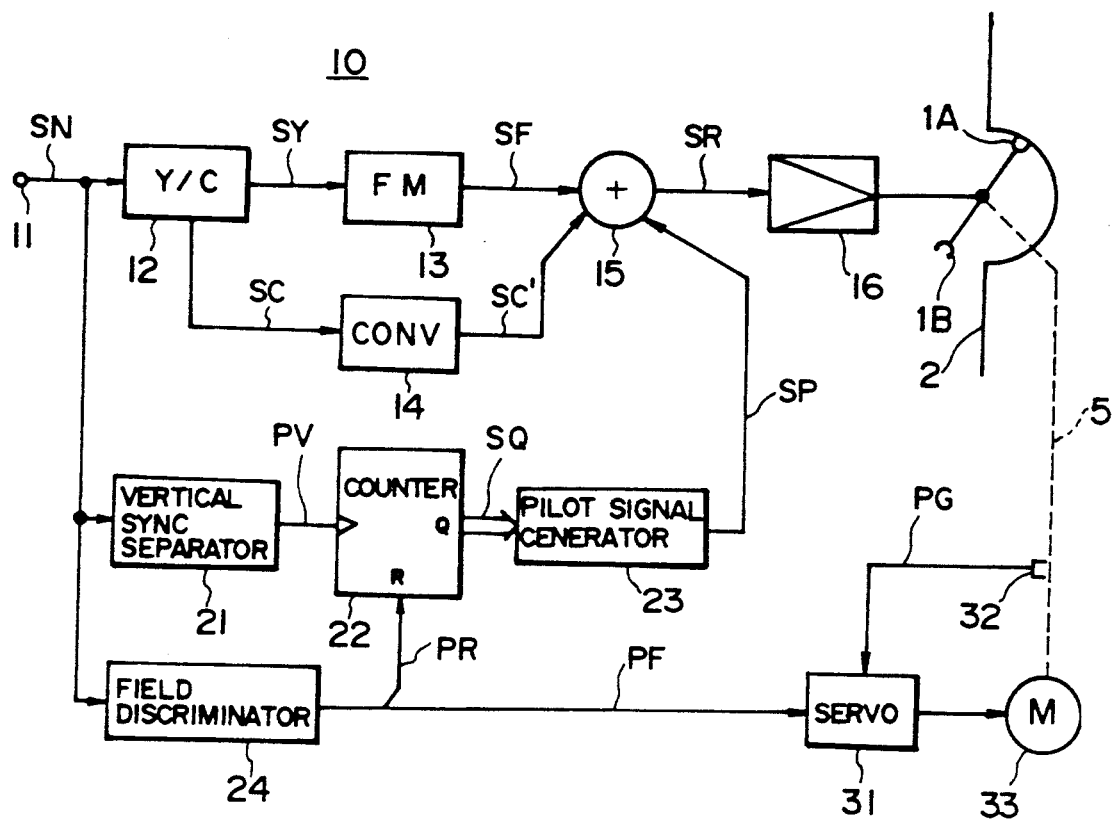
FIG. 3 is a block diagram of one embodiment of the present invention.

Referring now to FIG. 3, one embodiment of the present invention includes a recording circuit 10 comprised of video signal processing circuity, pilot signal generating circuitry and a servo-control circuit for controlling the rotary phase of the transducers used to record the video and pilot signals. The video signal processing circuitry is comprised of a luminance/chrominance (Y/C) separator 12, a frequency modulator 13 and a frequency converter 14. The luminance/chrominance separator is coupled to an input terminal 11 to receive an input video signal SN. As is conventional, Y/C separator 12 operates to separate the luminance component SY and the chrominance component SC from the input video signal SN. Frequency modulator 13 is coupled to Y/C separator 12 and is adapted to frequency modulate the luminance component SY to produce a frequency modulated signal (also referred to as an FM luminance signal) SF.

Figure 4:
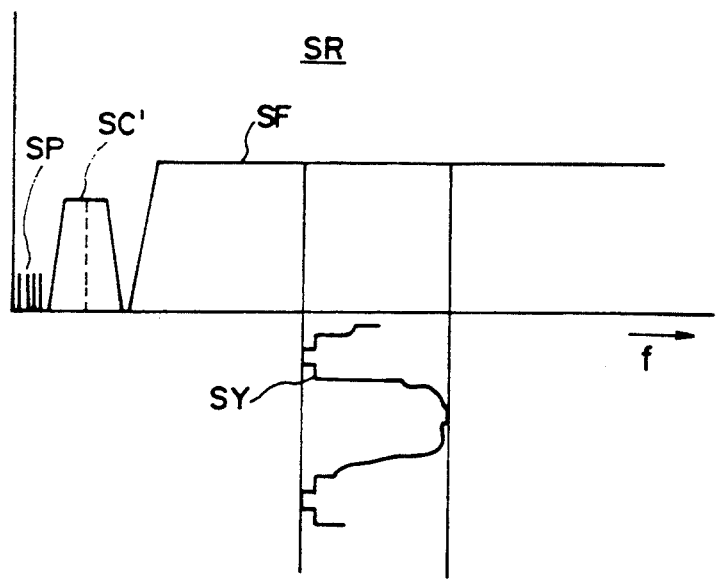
FIG. 4 is a graphical representation of the frequency spectrum of the recorded video signal and superimposed pilot signal.

Frequency converter 14 is coupled to Y/C separator 12 to receive the separated chrominance component SC and to convert the chrominance subcarrier thereof to a relatively low frequency. As an example, the converted frequency $f_{c'}$ of the frequency-converted chrominance component SC' is equal to 47.25 $f_H$, or 743 kHz. FIG. 4 graphically illustrates the frequency spectrum wherein the frequency-converted chrominance component SC' is seen to occupy a frequency range below the spectrum of the FM luminance component SF.

An adder 15 is coupled to frequency modulator 13 and frequency converter 14 for combining the FM luminance component SF and the frequency-converted chrominance component SC'. As will be described, adder 15 also superimposes onto these combined components the pilot signal SP produced by the pilot signal generating circuitry. FIG. 4 indicates that the frequency of the pilot signal is lower than the spectrum occupied by the frequency-converted chrominance component SC'.

The pilot signal generating circuitry is comprised of a vertical sync separator 21, a cyclical counter 22, a pilot frequency generator 23 and a field discriminator 24. Vertical sync separator 21 may be of conventional construction and is coupled to input terminal 11 to receive and extract from the input video signal SN the usual vertical synchronizing signal PV included therein. The extracted vertical synchronizing signal PV is supplied to counter 22 to increment the count thereof in response to each such extracted vertical synchronizing signal.

Counter 22 preferably is comprised of a two-bit counter having a count output Q coupled to pilot frequency generator 23. The two-bit count SQ generated by the counter is used by the pilot frequency generator to select a corresponding pilot frequency. Stated otherwise, the count SQ of counter 22 determines the pilot frequency $f_i$. It will be appreciated that the count of counter 22 represents the field period indicated in Table 1 set out hereinabove and, as one example, pilot frequency generator 23 generates the pilot frequency $f_1$ when the count SQ of counter 22 is indicative of field period 1. Similarly, the pilot frequency generator generates the pilot frequency $f_2$ when the count SQ is indicative of field period 2. It will be seen that the pilot frequency generator generates the pilot frequency $f_3$ when the count SQ is indicative of field period 3 and the pilot frequency $f_4$ when the count is indicative of field period 4. As one example, the pilot frequency generator may include a programmable divider which divides the frequency 378 $f_H$ by the divisor 58 when count SQ is indicative of field period 1, by the divisor 50 when the count is indicative of field period 2, by the divisor 36 when the count is indicative of field period 3 and by the divisor 40 when the count is indicative of field period 4. It will be readily appreciated by those of ordinary skill in the art that other implementations of pilot frequency generator 23 may be adopted. The pilot signal SP having the frequency generated by pilot frequency generator 23 is coupled to adder 15 whereat it is combined with the FM luminance component SF and the frequency-converted chrominance component SC'.

In the embodiment discussed above, wherein counter 22 is formed as a two-bit counter, it is seen that this counter is cycled in response to four successive vertical synchronizing signals PV and, thus, the pilot signal frequency $f_i$ is cycled over four fields.

Field discriminator 24 is coupled to input terminal 11 to receive the input video signal SN and is adapted to detect the sequential fields in the frames of the video signal. The field discriminator may be of conventional construction adapted to detect the phase relationship between the vertical and horizontal synchronizing pulses included in the odd and even fields of the video signal. In the preferred embodiment, the field discriminator operates to produce a reset pulse PR at the beginning of the odd field in alternate frames. For example, reset pulse PR is produced by field discriminator 24 at the beginning of the odd (or first) field of each of the nth, (n+2)th, (n+4)th, etc. frames. This reset pulse PR is supplied from the field discriminator to the reset input R of counter 22 and is adapted to reset the count SQ to an initial count. Stated otherwise, reset pulse PR is supplied to counter 22 to preset the count therein to a predetermined, or initial, count.

The field discriminator also is adapted to generate a field detect pulse PF at the beginning of the first, or odd, field in each frame. This field detect pulse PF is coupled to the servo-control circuit for the purpose of synchronizing the rotational phase of the recording heads with the frames, and particularly the vertical synchronizing signals therein, of the input video signal SN. It will be appreciated that, if desired, reset pulse PR may be derived from field detect pulse PF by a simple divide-by-two circuit.

The servo-control circuit is comprised of a servo circuit 31, a pulse generator 32 and a rotary drive motor 33. The rotary drive motor is mechanically coupled to recording heads 1A and 1B to rotate those heads across magnetic tape 2 at a rate and phase determined by the energization of motor 33. Pulse generator 32 is adapted to sense the rotary position of heads 1A and 1B. For example, the pulse generator may comprise a suitable pickup for generating a position pulse PG when the heads rotate to a predetermined position. It will be appreciated that this position pulse PG exhibits a repetition rate equal to the frame repetition rate of the video signal.

Servo circuit 31 is adapted to sense phase differences between position pulse PG and field detect pulse PF and adjust the energization of motor 33 so as to eliminate, or null, this phase difference. Thus, the servo-control circuit operates to rotate heads 1A and 1B at the video frame repetition rate and in phase synchronism with the first, or odd, field in each frame. Hence, heads 1A and 1B operate to record a track pattern having the format illustrated in FIG. 2.

The signal produced by adder 15, comprised of the combined FM luminance component SF and frequency-converted chrominance component SC' and the superimposed pilot signal SP, is supplied as a recording signal SR to heads 1A and 1B by way of a recording amplifier 16. Although not shown, it will be appreciated that a suitable head switching arrangement is provided such that the recording signal SR is supplied alternately to heads 1A and 1B as each respective head scans tape 2.

Although not shown in FIG. 3, it will be appreciated that tape 2 may be transported by conventional control means such that, when video signals from different sources are recorded so as to produce a joint or edit point, that joint or edit point occurs between track 3A and track 3B. This is conventional and the continuity, or periodicity, of tracks 3A and 3B thus is maintained.

In operation, it will be seen that if the input video signal SN is comprised of first and second fields in successive frames, such as shown in FIG. 5, field discriminator 24 generates the field detect pulse PF at the beginning of the first, or odd, field in each frame and generates the reset pulse PR at the beginning of the first, or odd, field in alternate frames, as also shown in FIG. 5. The vertical synchronizing signal PV extracted from the input video signal SN by vertical sync separator 21 increments counter 22 at each field interval. As count SQ changes, the count thereof determines the pilot frequency $f_i$ generated by pilot frequency generator 23. Hence, the frequency of the pilot signal SP changes at each field with a cycle equal to four fields or two frames. As shown in FIG. 5, the frequency of the pilot signal SP changes from $f_1$ to $f_2$ to $f_3$ to $f_4$ and then returns to $f_1$ at successive fields. It is also seen that the reset pulse PR produced by field discriminator 24 resets counter 22 to its initial, or preset count at the beginning of the first, or odd, field in alternate frames, thus assuring that the frequency of pilot signal SP is preset to, for example, the frequency $f_1$ periodically. Consequently, the frequency $f_i$ of the pilot signal SP has an initial frequency $f_1$ determined by the initial field in a four-field sequence, as detected by field discriminator 24. Moreover, this pilot frequency $f_i$ changes as a function of the detected sequential fields, that is, as each field in the sequence is received, or detected, the pilot frequency $f_i$ changes.

Moreover, since the servo-control circuit is supplied with the field detect pulse PF, the rotational phase of heads 1A and 1B is controlled such that head 1A records track 3A with a pilot frequency of $f_1$ or $f_3$ and head 1B records track 3B with a pilot signal of frequency $f_2$ or $f_4$. Thus, track 3A will not be recorded with a pilot frequency $f_2$ or $f_4$ and, similarly, track 3B will not be recorded with a pilot frequency $f_1$ or $f_3$. A summary of the pilot frequencies which are recorded in successive tracks by heads 1A and 1B during sequential field periods is as follows:

TABLE 2

| Field Period | Recording Head | Track | Pilot Frequency $f_i$ |
|---|---|---|---|
| 1 | 1A | 3A | $f_1$ |
| 2 | 1B | 3B | $f_2$ |
| 1 | 1A | 3A | $f_3$ |
| 2 | 1B | 3B | $f_4$ |
| 1 | 1A | 3A | $f_1$ |

It is seen, therefore, that the continuity, or periodicity of tracks 3A and 3B is maintained even when the video signal SN is derived from different sources and even when a joint or edit point is recorded on the tape. Therefore, framing is not disturbed and the joint or edit point does not produce a disturbance in the reproduced video picture. Consequently, when the video signals recorded on magnetic tape by the embodiment shown in FIG. 3 are reproduced and converted to a different format, disturbances and degradation in the video signal are avoided, or at least minimized, and are not attributed to difficulties that otherwise might arise at the joint or edit point.

Although the foregoing has described a video signal SN of the NTSC format, the present invention finds equal application in the EIAJ system, the CCIR monochromatic system and in the PAL system. By relying upon typical color framing techniques, satisfactory results are obtained if the input video signal SN is a PAL video signal. In that event, the relationship between the sequential fields and the pilot frequency recorded in successive tracks by the recording heads may be summarized as follows:

TABLE 3

| Field Period | Recording Head | Track | Pilot Frequency $f_i$ |
|---|---|---|---|
| 1 | 1A | 3A | $f_1$ |
| 2 | 1B | 3B | $f_2$ |
| 3 | 1A | 3A | $f_3$ |
| 4 | 1B | 3B | $f_4$ |
| 5 | 1A | 3A | $f_1$ |
| 6 | 1B | 3B | $f_2$ |
| 7 | 1A | 3A | $f_3$ |
| 8 | 1B | 3B | $f_4$ |

TABLE 3-continued

| Field Period | Recording Head | Track | Pilot Frequency $f_i$ |
|---|---|---|---|
| 9 | 1A | 3A | $f_1$ |

Therefore, it is seen that, in accordance with the present invention, the field period, recording head and pilot frequency all are maintained in a predetermined relationship during any video frame. Hence, a framing disturbance is avoided when the video signal is derived from separate sources for recording on either side of a joint or edit point on the magnetic tape. This improves the precision attainable during an edit operation and, moreover, permits simple signal format conversion by existing editing devices.

While the present invention has been particularly shown and described with reference to a preferred embodiment, it will be readily appreciated by those of ordinary skill in the art that various changes and modifications may be made without departing from the spirit and scope of the invention. For example, although the field detect pulse PF and the reset pulse PR are generated at the beginning of the first, or odd field, these pulses may be generated at the beginning of the second, or even, field in the frames. It is intended that the appended claims be interpreted as including the embodiment described herein, those changes and modifications which have been mentioned above and all equivalents thereto.

What is claimed is:

1. Apparatus for recording a video signal in successive tracks on a record medium together with a pilot signal, wherein the video signal has successive frames, each formed of plural fields, and wherein the pilot signal is cyclically recorded with a different one of at least four frequencies in successive tracks for tracking control during reproduction, said apparatus comprising:

plural transducer means rotatable for recording said video and pilot signals in successive tracks on a record medium;

pulse generating means for generating a pulse signal indicative of a rotational phase of the transducer means;

field detecting means supplied with said video signal for detecting sequential fields in the frames of said video signal;

phase control means coupled to said pulse generating means and said field detecting means for controlling the rotation of said transducer means in response to said pulse signal and the detected sequence of fields; and pilot signal generating means for generating said pilot signal with an initial frequency determined by an initial field in said detected sequence of fields, said frequency changing as a function of the detected sequential fields.

2. The apparatus of claim 1 wherein said pilot signal generating means includes cyclical counting means supplied with said video signal for counting the fields therein; pilot frequency generating means for generating a pilot frequency in response to the count of said counting means; and reset means coupled to said field detecting means for resetting said counting means to an initial count when said initial field in said detected sequence of fields is detected.

3. The apparatus of claim 2 wherein each frame of the video signal includes first and second fields; and wherein said field detecting means detects a predetermined one of said first and second fields in each frame.

4. The apparatus of claim 3 wherein said field detecting means produces a field detect pulse in response to the first field in each frame; and wherein said phase control means includes servo means for adjusting the rotation of said transducer means as a function of a phase difference between said field detect pulse and said pulse signal indicative of the rotational phase of said transducer means.

5. The apparatus of claim 3 wherein said field detecting means produces a reset pulse when the first field in every other frame is detected; and said reset means includes a reset input of said counting means for resetting said counting means in response to said reset pulse.

6. The apparatus of claim 2 further comprising vertical sync detecting means supplied with said video signal for detecting a vertical synchronizing signal included in said video signal and for incrementing said counting means in response to each detected vertical synchronizing signal.

7. The apparatus of claim 1 further including vertical sync detecting means supplied with said video signal for detecting a vertical synchronizing signal in said video signal, and said pilot signal generating means includes means for presetting the frequency of said pilot signal in response to the detection of a predetermined vertical synchronizing signal.

8. The apparatus of claim 7 wherein said pilot signal generating means further includes means for changing said frequency in response to each detected vertical synchronizing signal.

9. The apparatus of claim 8 wherein said means for changing said frequency comprises cyclical counting means for counting each detected vertical synchronizing signal, and pilot frequency generating means for generating a pilot signal frequency as a function of the count of said counting means.

10. The apparatus of claim 9 wherein said field detecting means detects a vertical synchronizing signal in a predetermined field in alternative frames of said video signal and is coupled to said counting means for presetting the count thereof.

11. The apparatus of claim 10 wherein said predetermined field is an initial field in alternate frames.

12. The apparatus of claim 1 wherein said field detecting means comprises vertical sync detecting means supplied with said video signal for detecting a vertical synchronizing signal in each field of the video signal, field discriminating means for discriminating a predetermined field in each frame and also for discriminating said same predetermined field in alternate frames, and presettable counting means for counting detected vertical synchronizing signals and preset in response to the discriminated predetermined field in alternate frames.

13. The apparatus of claim 12 wherein said phase control means comprises servo means coupled to said pulse generating means and said field discriminating means for controlling the rotation of said transducer means as a function of a phase difference between the generated pulse and the discriminated predetermined field in each frame.

14. The apparatus of claim 12 wherein said pilot signal generating means comprises frequency generating means coupled to said counting means for generating a pilot signal frequency determined by the count of said counting means.

* * * * *